(12) United States Patent
Menzel

(10) Patent No.: US 10,972,719 B1
(45) Date of Patent: Apr. 6, 2021

(54) HEAD-MOUNTED DISPLAY HAVING AN IMAGE SENSOR ARRAY

(71) Applicant: NVIDIA Corporation, Santa Clara, CA (US)

(72) Inventor: Jan Robert Menzel, Aachen (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/680,092

(22) Filed: Nov. 11, 2019

(51) Int. Cl.
*H04N 13/344* (2018.01)
*H04N 13/324* (2018.01)
*G06T 11/00* (2006.01)
*H04N 13/282* (2018.01)

(52) U.S. Cl.
CPC .......... *H04N 13/344* (2018.05); *G06T 11/00* (2013.01); *H04N 13/282* (2018.05); *H04N 13/324* (2018.05)

(58) Field of Classification Search
CPC .... G06T 11/00; H04N 13/293; H04N 13/344; H04N 13/324; H04N 13/282; G06K 9/00671; G06K 9/00597
See application file for complete search history.

(56) References Cited

U.S. PATENT DOCUMENTS

| 2015/0138065 A1* | 5/2015 | Alfieri | G06F 3/011 345/156 |
| 2018/0239425 A1* | 8/2018 | Jang | G02B 27/017 |
| 2019/0243448 A1* | 8/2019 | Miller | A61B 3/111 |

* cited by examiner

*Primary Examiner* — Antonio A Caschera
(74) *Attorney, Agent, or Firm* — Zilka-Kotab, P.C.

(57) ABSTRACT

Head-mounted Displays (HMDs) are commonly used for virtual reality, mixed reality, and augmented reality. HMDs are, by definition, worn on the head of a user to provide a display in the line of sight of the user. By viewing the display, the user is able to experience one of the aforementioned types of reality. Oftentimes, HMDs are configured to integrate live video captured from the user's perspective, especially in the case of the HMD providing augmented reality where a virtual environment is combined with video of the real world. The present disclosure provides a configuration for a HMD having an array of image sensors to accurately capture image data to form the live video from the user's perspective.

11 Claims, 6 Drawing Sheets

HEAD-MOUNTED DISPLAY HAVING AN IMAGE SENSOR ARRAY

TECHNICAL FIELD

The present disclosure relates to Head-mounted Displays (HMDs).

BACKGROUND

Head-mounted Displays (HMDs) are commonly used for virtual reality, mixed reality, and augmented reality. HMDs are, by definition, worn on the head of a user to provide a display in the line of sight of the user. By viewing the display, the user is able to experience one of the aforementioned types of reality.

In general, two types of HMDs can be distinguished: so-called video-see-through HMDs and optical-see-through HMDs. In an optical-see-through HMD the user can observe the real environment directly and observes the virtual content as an overlay added by semitransparent mirrors and/or displays. For certain applications video-see-through HMDs are better suited which combine a live video stream with the virtual content and present the combination to the user using a display.

In order to capture the live video from the user's perspective, the HMD has traditionally been equipped with two cameras, each one for capturing video relative to a corresponding eye of the user. However, this traditional HMD configuration is unable to accurately capture the live video from the user's perspective. The correct perspective cannot be captured by using a regular camera directly as the required location for a regular camera is already occupied by the user's eyes.

In particular, when the cameras are placed on the HMD in front of the user's eyes, their lateral distance from the user's eyes allows the cameras to rotate in a larger circle, and capture a slightly different perspective than the user's eyes would be capable. When the cameras are placed slightly above the user's eyes (i.e. on the user's forehead) but on basically the same vertical plane as the user's eyes, the height of the cameras from the ground is not equivalent to the height of the user's eyes from the ground, such that the cameras capture video at an elevation that is higher than the actual view from the user's eyes.

There is a need for addressing these issues and/or other issues associated with the prior art.

SUMMARY

A method, computer readable medium, and system are disclosed for a head-mounted display (HMD) having an image sensor array. The image sensor array includes a left portion comprised of a plurality of left image sensors configured to capture image data to form live video from a perspective of a left eye of a user, and further a right portion comprised of a plurality of right image sensors configured to capture image data to form live video from a perspective of a right eye of the user. The image data captured by the image sensor array can easily be combined to create the same images that would be captured by two regular cameras (one per eye) which would be positioned at the location of the user's eye. The HMD further has a display for displaying the live video formed from the perspective of the left eye of the user and the live video formed from the perspective of the right eye of the user.

DETAILED DESCRIPTION

Figure 1:
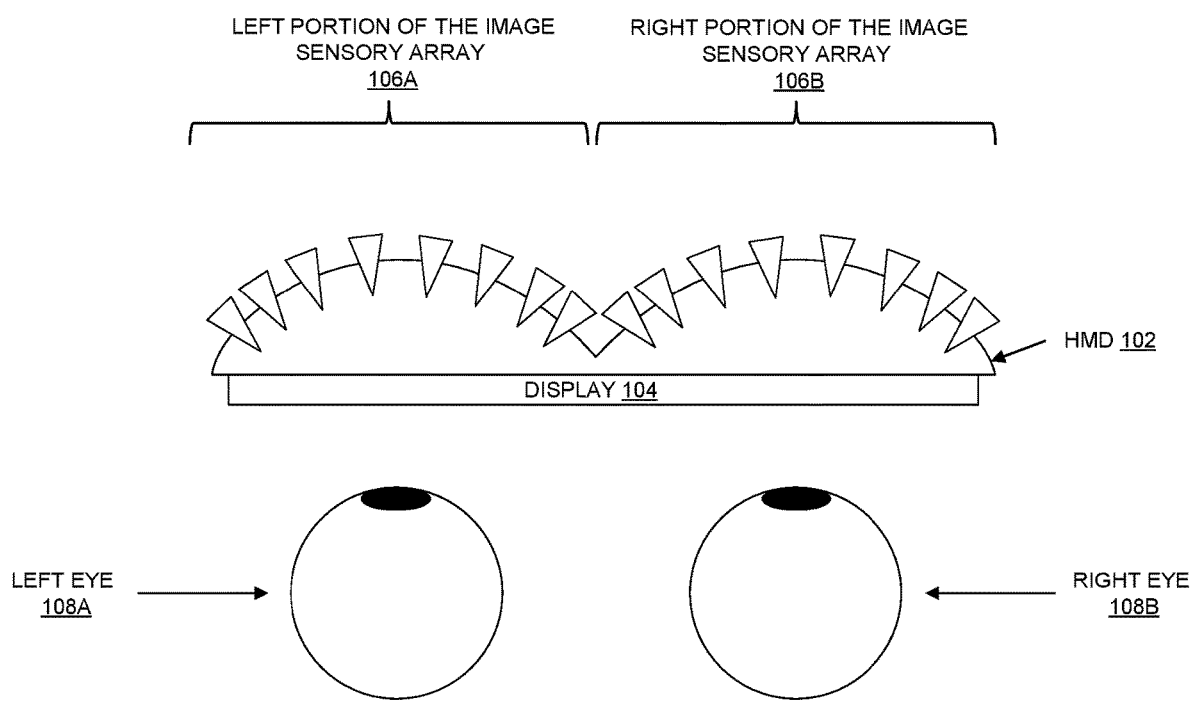
FIG. 1 illustrates a diagram of a head-mounted display (HMD) having an image sensor array, in accordance with an embodiment.

FIG. 1 illustrates a diagram of a head-mounted display (HMD) 102, in accordance with an embodiment. In the context of the present description, the HMD 102 is a device intended to be worn on the head of a user to provide a display in the line of sight of the user. The HMD 102 is configured to provide a modified virtual reality, mixed reality, and/or augmented reality experience to the user when wearing the HMD 102.

To allow the user to focus on the display 104 this close to the user's eyes, HMDs place one or more additional lenses between the eye and the display. This aspect is well understood when building HMDs and thus is omitted from the figures to simplify the diagrams and allow a better understanding of how the natural perspective of the user can be captured using an image sensor array.

For each pixel on the display 104 the ray of light needs to be captured which would hit the user's eye if no HMD would occlude the view. In one embodiment only a subset of the light rays will get captured while the remaining pixels of the display 104 will get interpolated. These light rays will hit the HMDs surface on the intersection of the HMDs surface and the line between the user's eye and the pixel. To capture all these light rays, the HMDs surface is covered with an image sensor array composed of a left portion 106A and a right portion 106B.

The left portion 106A of the image sensor array, which is comprised of a plurality of left image sensors, captures image data from a perspective of a left eye of the user. In one embodiment, image data captured by each of the image sensors in the left portion 106A is combined to form (i.e. create) the live video from the perspective of a left eye 108A of the user.

Additionally, the right portion 106B of the image sensor array, which is comprised of a plurality of right image sensors, captures image data from a perspective of a right eye 108B of the user. In one embodiment, image data captured by each of the image sensors in the right portion 106B is combined to form the live video from the perspective of the right eye of the user.

The display 104 displays the live video formed from the perspective of the left eye of the user and the live video formed from the perspective of the right eye of the user. The HMD 102 causes the live video formed from the perspective of the left eye of the user and the live video formed from the perspective of the right eye of the user to be displayed in a manner that provides the modified virtual reality, mixed reality, and/or augmented reality experience to the user. For example, in one embodiment, the HMD 102 integrates the live video formed from the perspective of the left eye of the user and the live video formed from the perspective of the right eye of the user with a virtual environment to provide, via the display 104, a modified virtual reality, a mixed reality, or an augmented reality experience to the user.

Figure 2A:
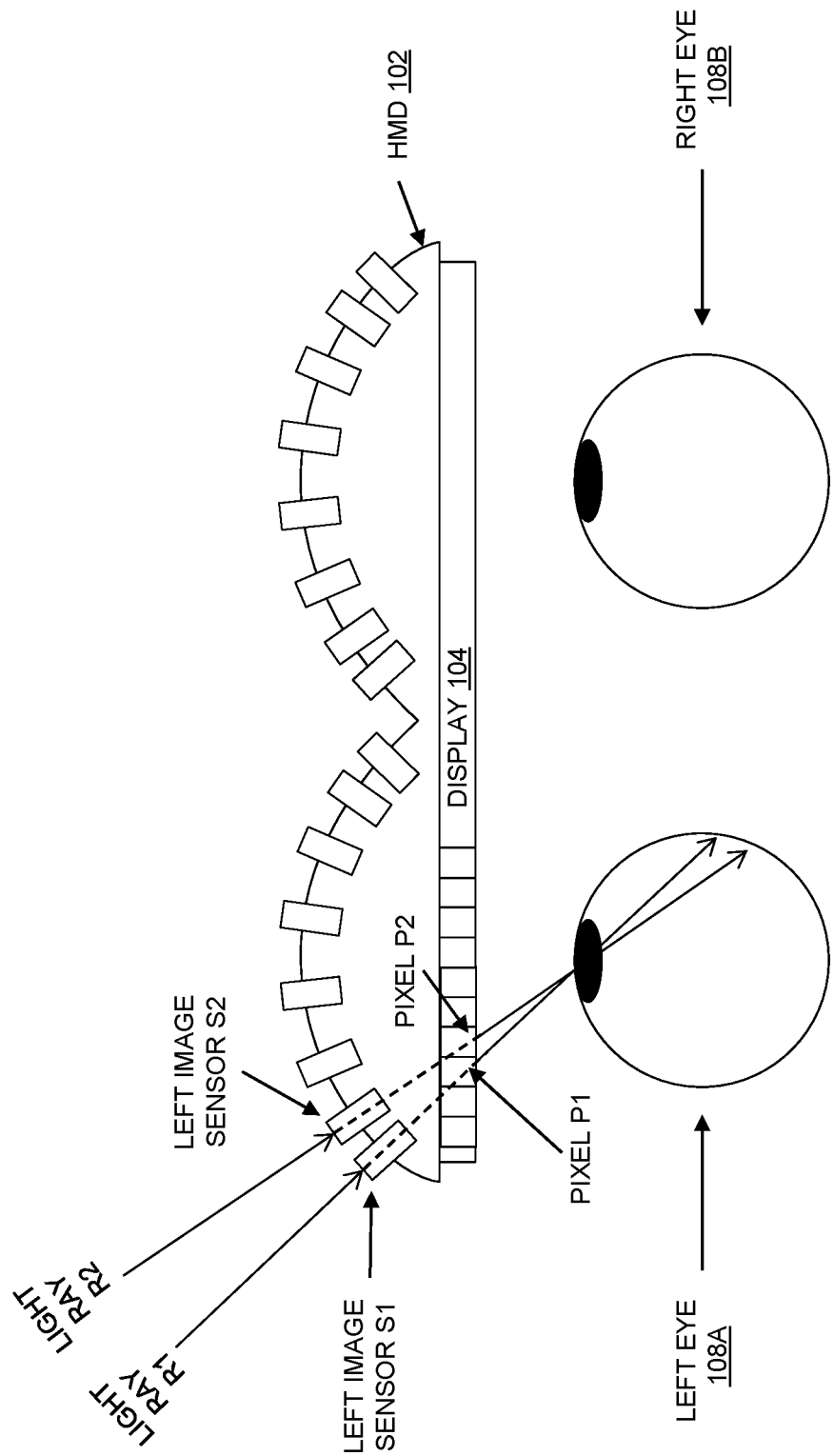
FIG. 2a illustrates a technique for pixel intersection on the HMD of FIG. 1, which is used to map image sensors to pixels, in accordance with an embodiment.

In one embodiment, depicted in FIG. 2a each of the image sensors in the left portion 106A and the right portion 106B is an individual directed light sensor. For example, each directed light sensor may capture one of red, green, or blue from the scene. In another embodiment each directed light sensor captures the full red, green and blue color information for one pixel of the display 104. These sensors can be individual electrical components or multiple sensors might be combined on a single Complementary Metal Oxide Semiconductor (CMOS) DIE with the optical components for multiple sensors mounted directly to the die.

Figure 2B:
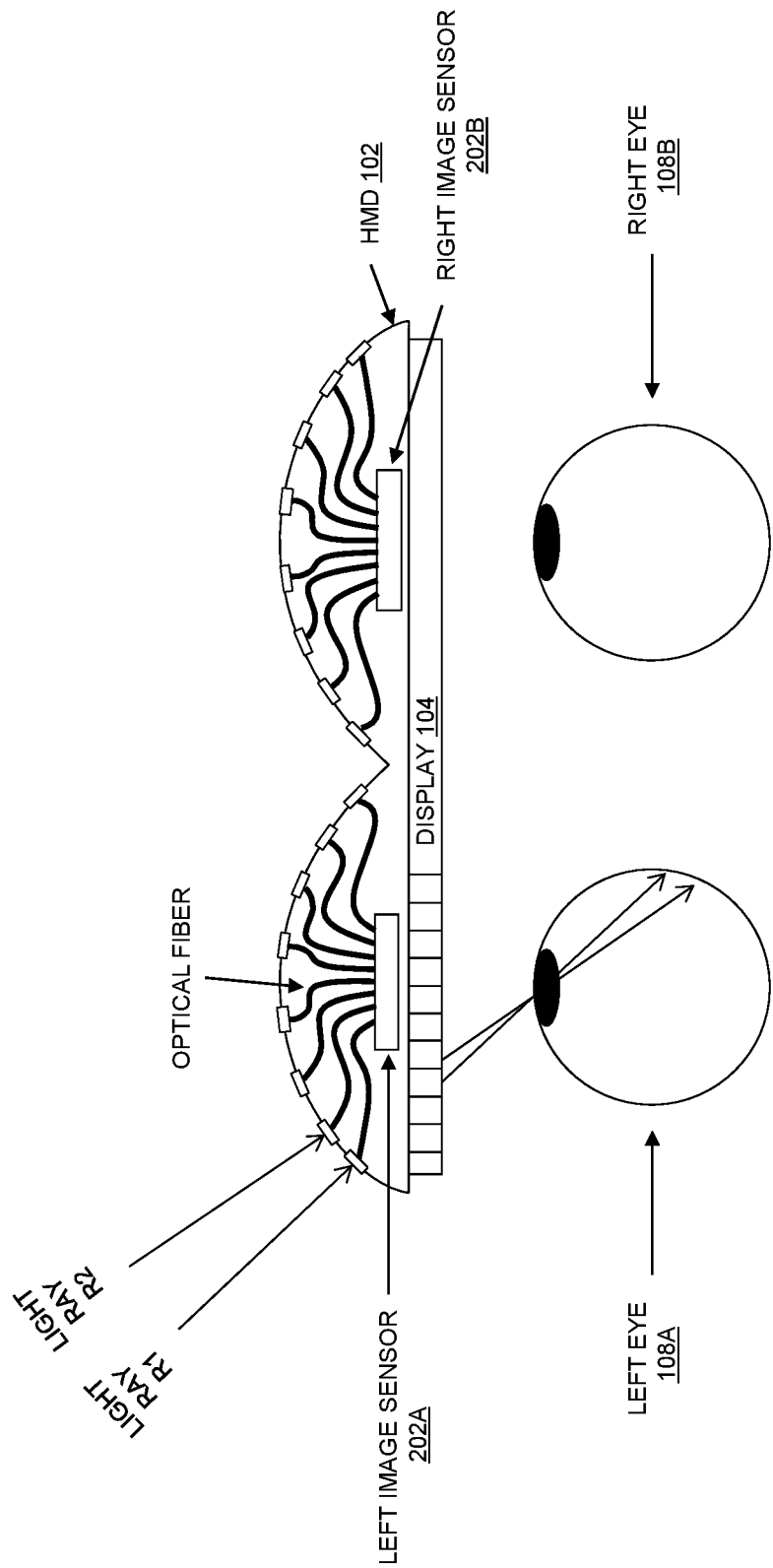
FIG. 2b illustrates an embodiment using optical fiber to combine multiple incoming light directions to be mapped onto a single image sensor.

Depicted in FIG. 2b, the idea of combining multiple sensors onto one combined sensor die is shown in a more extreme embodiment. Here, the light hitting the HMDs surface from the desired direction is routed via an optical fiber to an image sensor 202A for the left portion and a sensor 202B for the right portion. Thus, a lower number of components can be used. In one embodiment these sensors are regular digital camera sensors. In another embodiment multiple image sensors are used, each of which is optically connected to a subset of the surface locations on the HMD at which the light needs to get captured from a specific direction.

Figure 2C:
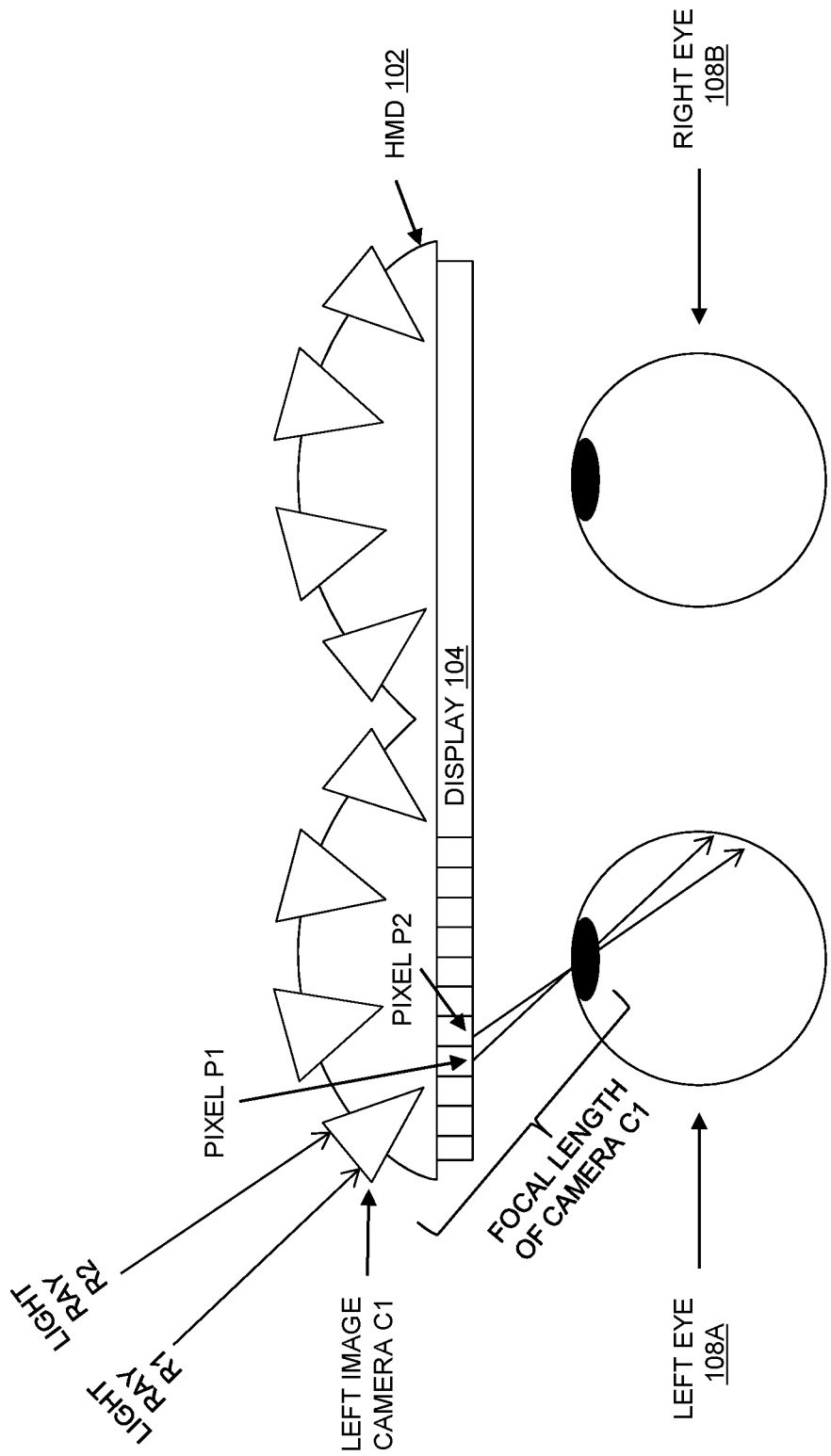
FIG. 2c illustrates an embodiment using cameras in the sensor array.

In another embodiment, depicted in FIG. 2c, each of the image sensors in the left portion 106A and the right portion 106B is a camera capable of taking a digital photograph of a scene. In one embodiment each of these cameras act in a similar way as a telephoto lens in the sense that the physical length is shorter than the focal length. In one embodiment the focal length is the distance between the camera and the user's eye to capture exactly the rays of light which would otherwise hit the user's eye.

The array of image sensors in the left portion 106A and the right portion 106B may be attached to the HMD 102 at a location in front of the user's eyes 108A, 108B. Thus, the array of image sensors may be at a same, or substantially similar, elevation as the user's eyes. In an embodiment, a principal axis of each image sensor in the left portion 106A of the image sensor array is positioned to intersect the middle of the lens of the left eye 108A of the user. Similarly, a principal axis of each image sensor in the right portion 106B of the image sensor array is positioned to intersect the middle of the lens of the right eye 108B of the user.

By this configuration, in an embodiment, the array of images sensors may include an image sensor that captures each ray of light from the real world environment that would otherwise hit the lens of the user's eye if not wearing the HMD 102. As another option, each image sensor in the image sensor array may capture multiple rays of light from the real world environment from slightly different directions, all of which would otherwise hit the lens of the user's eye if not wearing the HMD 102. The image data captured by the images sensors at a particular point in time may then be used to reconstruct an image at a same perspective of the user, and thus matching a real world image the user would see if not wearing the HMD 102.

To allow for the aforementioned image construction, each image sensor in the image sensor array of the HMD 102 may be mapped to a corresponding pixel of the display 104, based on iris positions determined for the user, as described in more detail below with respect to FIG. 2a-2c. In one embodiment, every pixel of the display 104 may be mapped to a separate image sensor in the image sensor array. Of course, it should be noted that mention of an image sensor per pixel may refer to combined RGB image sensors per pixel (i.e. a combination of 3 images sensors when each is designated for red, green, and blue color capture). Thus, there may be a 1:1 ratio of image sensors (or RGB combined image sensors) to pixels. Nevertheless, in this embodiment, data captured by an image sensor may be used to color its corresponding pixel. Accordingly, image reconstruction may be performed without complex real-time computations since the mapping between the output of each image sensor and the final image from the user's perspective is fixed.

FIG. 2a further depicts how a light ray hits the principal axis of a directed image sensor. Such a sensor is basically a one-pixel camera with a simple lens blocking all light except from the desired direction. For each sensor a pixel on the display 104 can be found which is seen by the user from the same direction the light ray hit the sensor. For example, the left sensor S1 corresponds to pixel P1 on the display 104. It can be seen in FIG. 2a that the light emitted by P1 seen by the user appears to come from the same direction as the light ray R1 which triggered the sensor S1.

In an embodiment of the HMD 102 having a high-resolution display 104 (e.g. multiple megapixels per eye) with one sensor per pixel, millions of sensors per eye would be required. In the embodiments depicted in FIGS. 2b and 2c, the number of sensors can be reduced while remaining the same amount of captured information.

FIG. 2b depicts the situation from FIG. 2a in a different embodiment using an optical method (e.g. optical fiber) to route multiple positions for single sensors on the HMDs surface to one combined sensor.

FIG. 2c depicts the same situation in an embodiment combining multiple positions for single sensors on the HMDs surface into a single camera. In one embodiment these use telephoto lenses to capture the incoming light rays from exactly the same direction as the before mentioned embodiments. In another embodiment the focal length of the cameras would not fit the ideal focal length. In this case the best matching pixel from a camera can be selected by known computer vision algorithms, including, but not limited to, a (complete or partial) depth or 3D scene reconstruction by stereo vision or structure from motion In this embodiment the larger amount of cameras compared to a traditional 2 camera HMD provides more input data for 3D scene reconstruction algorithms, which can lead to a more robust reconstruction which then can be projected back into the field of view of the user.

In another embodiment, the image sensor array may only capture a subset of the rays of light from the real world environment that is required to present a correct color value to the user using the display 104. This means only a subset of pixels of the display 104 may be mapped to a separate image sensor in the array of image sensors. From this subset, the remaining rays of light not captured by the image sensor array may be deduced from the image data captured by the image sensors at a particular point in time (e.g. using bilinear interpolation).

As noted above, one embodiment may involve the HMD 102 having one camera per pixel of the display 104, where the one camera pixel which lies directly on the axis from the camera lens to the user's iris is selected for the display pixel. This camera's pixel will be capturing exactly the ray of light which would fall into the user's eye if there would be no HMD in the way. As each user's head is formed differently, depending on the iris position (e.g. measured with a user facing camera, similar to that used for eye tracking), the correct pixel can be selected from each camera in the array. In case no single pixel from a camera can be found which captures light from the correct direction, the same interpolation techniques can be used as described above in case the number of pixels on the display 104 is higher than the number of sensors in the sensor array.

To this end, the HMD 102, as described above, is configured to have an image sensor array, whether cameras or directed light sensors, in order to more accurately capture image data to form live video from the user's perspective. In particular, the image sensors can have the same field of view as the user's eyes, and by this configuration can capture the same amount of peripheral view as the user's eyes would otherwise be capable of capturing when not wearing the HMD 102. Additionally, the image sensors can be located on a portion of the HMD 102, such that when the HMD 102 is worn by the user, a correct angle is provided as the image sensors are positioned exactly in front of the user's eyes. The live video can then be integrated with a virtual environment to provide a modified virtual reality, a mixed reality, or an augmented reality experience to the user.

As an option, given the large number of image sensors, sensor dies may be used, similar to normal camera Complementary Metal Oxide Semiconductor (CMOS) sensors, but with fewer pixels, and the "optics" (i.e. directed light sensors) may be placed directly on the die to get multiple directed light sensors from one element. Depending on the complexity of the optical paths, this can be seen as a compromise of the embodiments in FIG. 2a and FIG. 2b.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIGS. 2a-2c illustrate a technique for pixel intersection on the HMD of FIG. 1, which is used to map image sensors to pixels, in accordance with an embodiment. As noted above, each image sensor in the image sensor array of the HMD 102 may be mapped to a corresponding pixel of the display 104, based on iris positions determined for the user.

Using the intersection technique, in one embodiment, every pixel of the display 104 may be mapped to a corresponding separate image sensor. In another embodiment, using the intersection technique, only a subset of pixels of the display 104 may be mapped to a corresponding separate image sensor. These embodiments are mentioned above.

In the present embodiments of FIG. 2a-2c, the HMD 102 is calibrated to determine, for the user, the mapping between image sensors and pixels. Thus, the HMD 102 may be calibrated for the specific user wearing the HMD 102. The calibration is performed by determining iris positions of the user wearing the HMD 102 and then mapping each image sensor in the image sensor array of the HMD 102 to a corresponding pixel of the display 104 of the HMD 104, based on the iris positions determined for the user. The iris positions can be determined using one or more cameras positioned on the HMD 102 facing the user's eyes, as an option. For example, one or more images of the user's eyes captured by the camera(s) can be processed to determine the iris positions for the user.

In the embodiment shown, a line from the center of the iris of an eye of the user through each pixel of the display may be determined and then extended to determine which, if any, of the image sensors are intersected by the line. The pixel may then be mapped to the intersected image sensor. In another embodiment (not shown), for each principal axis of an image sensor intersecting the middle of the lens of a corresponding eye of the user, an intersected pixel therebetween may be identified. The intersected pixel that is identified may then be mapped to the image sensor.

As shown in FIG. 2a, the principal axis of image sensor S1 is positioned to intersect the middle of the lens of the left eye of the user. Pixel P1 is identified as the pixel intersected by a light ray captured by sensor S1. Thus, pixel P1 and sensor S1 may be mapped. Similarly, the principal axis of image sensor S2 is positioned to intersect the middle of the lens of the left eye of the user. Pixel P2 is identified as the pixel intersected by a light ray captured by sensor S2. Thus, pixel P2 and sensor S2 may be mapped.

Figure 3:
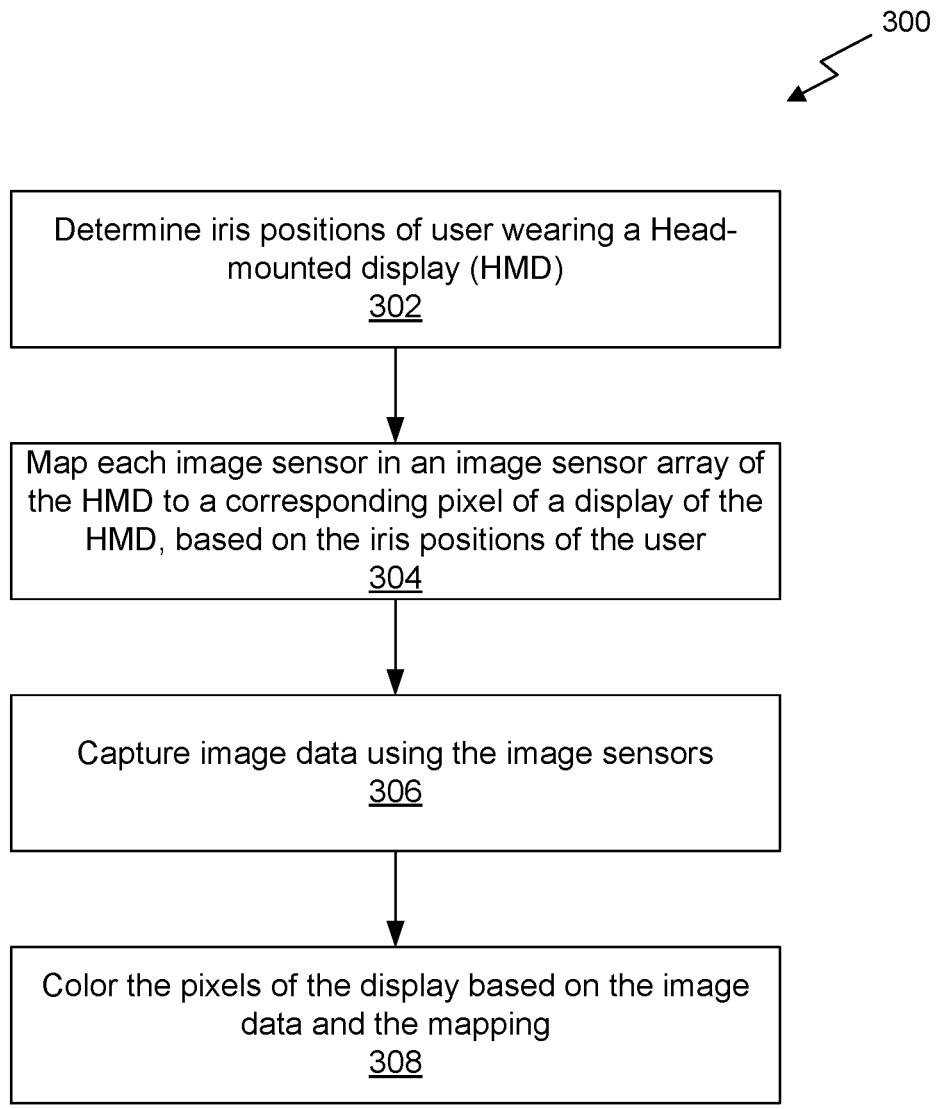
FIG. 3 illustrates a method for an HMD having an array of image sensors, in accordance with an embodiment.

FIG. 3 illustrates a method 300 of a HMD having an array of image sensors, in accordance with an embodiment. The method 300 may be performed by the HMD 102 of FIG. 1, in one embodiment. As an option, the HMD may be configured according to the system 400 of FIG. 4 described below, to enable a processor of the HMD to perform the method 300.

Operations 302-304 relate to calibration of the HMD for a particular user wearing the HMD. In operation 302, iris positions of the user wearing the HMD are determined. The iris positions may be determined or measured with respect to the HMD, for example using an eye-facing camera of the HMD.

In operation 304, each image sensor in an image sensor array of the HMD is mapped to a corresponding pixel of a display of the HMD, based on the iris positions determined for the user. For example, the image sensor array may be comprised of a left portion corresponding to a left eye of the user and a right portion corresponding to a right eye of the user. For the left portion of the image sensor array, a line from the center of the left iris through each pixel of the left half of the display may be determined and then extended to determine which, if any, of the image sensors in the left portion of the image sensor array are intersected by the line. The pixel and intersected image sensor are then mapped (e.g. a correlation is stored in memory). Similarly, for the right portion of the image sensor array, a line from the center of the right iris through each pixel of the right half of the display may be determined and then extended to determine which, if any, of the image sensors in the right portion of the image sensor array are intersected by the line. The pixel and intersected image sensor are then mapped.

Operations 306-308 relate to live video formed by the HMD via the image sensor array. In operation 306, image data is captured using the image sensors in the image sensor array. The image data may be captured on a frame-by-frame basis. Thus, the image sensors may be synchronized in capturing image data for each frame.

Then, in operation 308, the pixels of the display are colored based on the image data and the mapping. In an embodiment where a pixel is mapped to a particular image sensor, then the image data captured by that image sensor may simply be used to determine the color of the corresponding pixel. In an embodiment where a pixel is not mapped to a particular image sensor, then the image data used to color one or more neighboring pixels to the pixel may be used to determine the color of the pixel. Of course, the pixels may also be colored based on a virtual environment, to provide an integration of the live video with the virtual environment.

Figure 4:
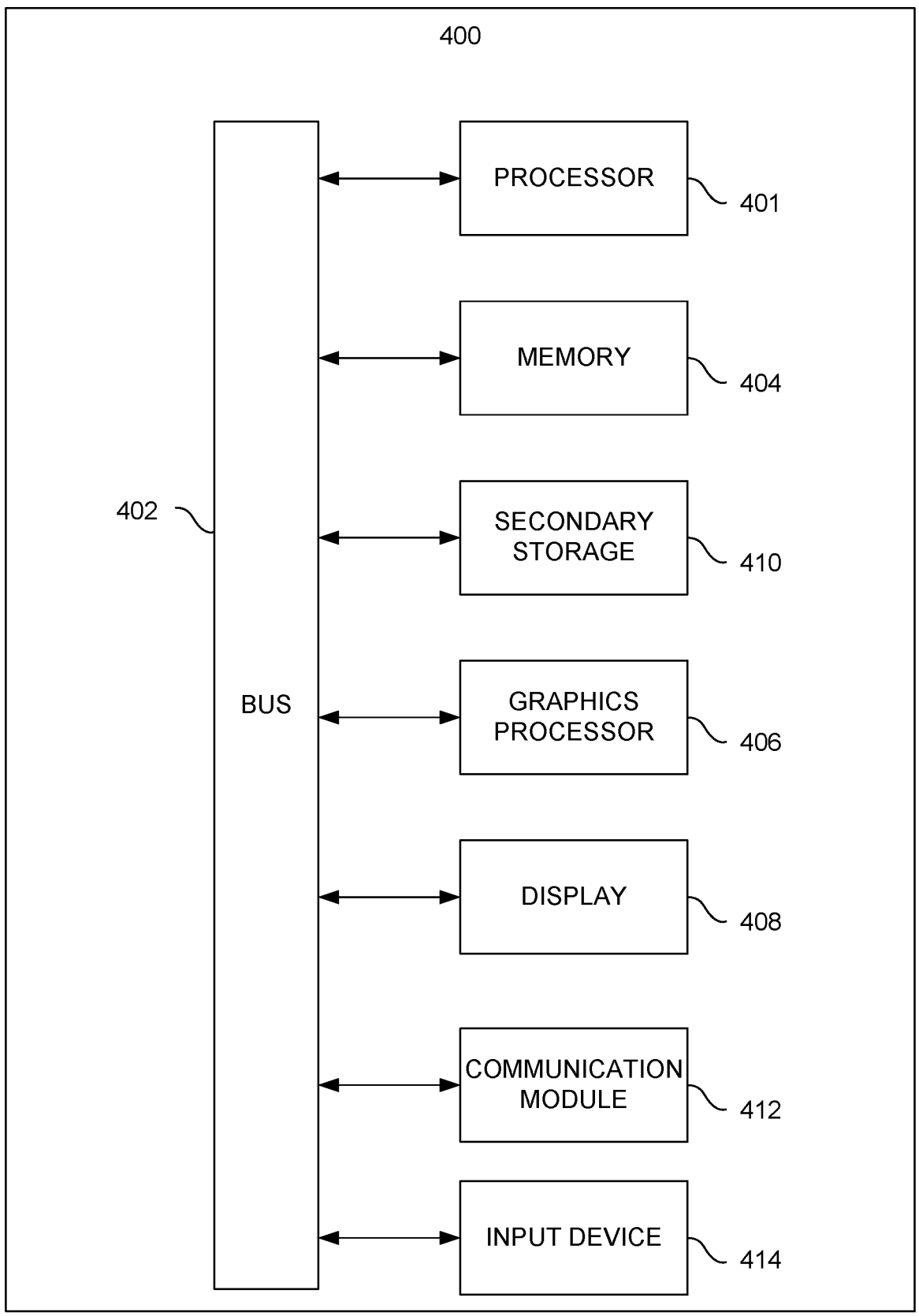
FIG. 4 illustrates an exemplary computing system, in accordance with an embodiment.

FIG. 4 illustrates an exemplary computing system 400, in accordance with an embodiment. The HMD 100 (not shown) may be in communication with the system 400 to receive output of the system 400 and to provide input to the system 400. Just by way of example, the HMD 100 may receive from the system 400 virtual images to combine with the live video formed by the HMD 100. The HMD 100 and the system 400 may be located in the same environment, or remotely (e.g. the system 400 may be located in the cloud). It should be noted that the HMD 100 may communicate with the system 400 via a wired connection or a wireless network connection (e.g. WiFi, cellular network etc.). As an option, one or more of the components shown in system 400 may be implemented within the HMD 100 of FIG. 1.

As shown, the system 400 includes at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, a flash drive or other flash storage, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions, including for example calibration of the HMD 102, forming of live video, and coloring of pixels on display 104, as set forth above. The computer programs, when executed, may also enable integration of live video with a virtual environment to provide a modified virtual reality, a mixed reality, or an augmented reality to the user. Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices (e.g. game consoles, personal computers, servers etc.) through a variety of possible standard or proprietary wired or wireless communication protocols (e.g. via Bluetooth, Near Field Communication (NFC), Cellular communication, etc.).

As also shown, the system 400 may include one or more input devices 414. The input devices 414 may be a wired or wireless input device. In various embodiments, each input device 414 may include a keyboard, touch pad, touch screen, game controller, remote controller, or any other device capable of being used by a user to provide input to the system 400.

What is claimed is:

1. A head-mounted display (HMD), comprising:
   an image sensor array, including:
      a left portion of the image sensor array comprised of a plurality of left image sensors configured to capture image data to form live video from a perspective of a left eye of a user,
      a right portion of the image sensor array comprised of a plurality of right image sensors configured to capture image data to form live video from a perspective of a right eye of the user,
   wherein a principal axis of each left image sensor in the left portion of the image sensor array is positioned to intersect a middle of a lens of the left eye of the user, and
   wherein a principal axis of each right image sensor in the right portion of the image sensor array is positioned to intersect a middle of a lens of the right eye of the user; and
   a display for displaying the live video formed from the perspective of the left eye of the user and the live video formed from the perspective of the right eye of the user.

2. The head-mounted display of claim 1, wherein the image data captured by each of the left image sensors is combined to form the live video from the perspective of the left eye of the user, and wherein the image data captured by each of the right image sensors is combined to form the live video from the perspective of the right eye of the user.

3. The head-mounted display of claim 1, wherein the HMD integrates the live video from the perspective of the left eye of the user and the live video from the perspective of the right eye of the user with a virtual environment to provide a modified virtual reality, a mixed reality, or an augmented reality to the user via the display.

4. The head-mounted display of claim 1, wherein each of the left image sensors and each of the right image sensors is an individual directed light sensor.

5. The head-mounted display of claim 1, wherein the image sensor array is attached to the HMD at a location in front of the user's eyes.

6. The head-mounted display of claim 1, wherein every pixel of the display of the HMD is mapped to a separate image sensor in the image sensor array.

7. The head-mounted display of claim 6, wherein image data captured by each of the left image sensors and each of the right image sensors is used to color the pixel to which the image sensor is mapped.

8. The head-mounted display of claim 1, wherein only a subset of pixels of the display of the HMD are mapped to a separate image sensor in the image sensor array.

9. The head-mounted display of claim 1, wherein the HMD is calibrated for the user to determine a mapping between image sensors of the image sensor array and pixels of the display.

10. The head-mounted display of claim 9, wherein the calibration measures the iris positions of the user, and the mapping is based on the iris positions of the user.

11. A head-mounted display (HMD), comprising:
    an image sensor array, including:
       a left portion of the image sensor array comprised of a plurality of left image sensors configured to capture image data to form live video from a perspective of a left eye of a user, and
       a right portion of the image sensor array comprised of a plurality of right image sensors configured to capture image data to form live video from a perspective of a right eye of the user; and
    a display for displaying the live video formed from the perspective of the left eye of the user and the live video formed from the perspective of the right eye of the user;
       wherein only a subset of pixels of the display of the HMD are mapped to a separate image sensor in the image sensor array;
       wherein image data captured by each of the left image sensors and each of the right image sensors is used to color the pixel to which the image sensor is mapped, and wherein each remaining pixel not mapped to a separate image sensor in the image sensor array is colored based on a color of one or more adjacent pixels to the remaining pixel.

\* \* \* \* \*